United States Patent
Venkatachari et al.

(10) Patent No.: US 9,253,689 B2
(45) Date of Patent: Feb. 2, 2016

(54) METHOD AND APPARATUS FOR REGAINING SERVICE BY SELECTING A DETECTED CELL NOT INCLUDED IN A NEIGHBOR CELL LIST (NCL)

(71) Applicant: QUALCOMM Incorporated, San Diego, CA (US)

(72) Inventors: Harish Venkatachari, Sunnyvale, CA (US); Preyas Devangbhai Desai, San Diego, CA (US); Ayyappan Ravichandran, San Diego, CA (US); Sundaresan Tambaram Kailasam, San Diego, CA (US); Uzma Khan, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 14/158,464

(22) Filed: Jan. 17, 2014

(65) Prior Publication Data

US 2015/0004970 A1    Jan. 1, 2015

Related U.S. Application Data

(60) Provisional application No. 61/840,051, filed on Jun. 27, 2013.

(51) Int. Cl.
*H04W 36/00* (2009.01)
*H04W 36/30* (2009.01)
(Continued)

(52) U.S. Cl.
CPC .......... *H04W 36/0055* (2013.01); *H04W 36/30* (2013.01); *H04W 48/16* (2013.01); *H04W 36/0083* (2013.01); *H04W 36/14* (2013.01)

(58) Field of Classification Search
CPC .......... H04W 36/0083; H04W 84/045; H04W 36/0061; H04W 36/08; H04W 36/04; H04W 36/30; H04W 36/06; H04W 36/14; H04W 48/16; H04W 48/18; H04W 48/20
See application file for complete search history.

(56) References Cited

U.S. PATENT DOCUMENTS

2011/0237269 A1    9/2011    Chen
2012/0108270 A1    5/2012    Kazmi et al.
(Continued)

FOREIGN PATENT DOCUMENTS

GB    2495008 A    3/2013
WO    WO-2008131591 A1    11/2008

OTHER PUBLICATIONS

"3rd Generation Partnership Project ; Technical Specification Group Radio Access Network; Radio Resource Control ( RRC);Protocol Specification (Release11)" 3GPP Standard; 3GPP TS 25.331, 3rd Generation Partnership Project (3GPP), Mobile Competence Centre; 650, Route Des Lucioles ; F-06921 Sophia-Antipolis Cedex , France, No. V11.5.0, Mar. 16, 2013, pp. 1-2079, XP050692284.
(Continued)

*Primary Examiner* — Nam Huynh
(74) *Attorney, Agent, or Firm* — Arent Fox LLP

(57) ABSTRACT

The present disclosure presents a method and apparatus for regaining service at a user equipment. For example, the disclosure presents a method for receiving a neighbor cell list from a serving cell, and scanning to identify target cells by the user equipment, wherein the target cells include neighbor cells included in the neighbor cell list and detected cells not included in the neighbor cell list. In addition, such an example method may include determining that the user equipment cannot successfully camp on any one of the neighbor cells, and attempting to camp on one of the detected cells. As such, an improved method and apparatus for regaining service at a user equipment may be achieved.

26 Claims, 8 Drawing Sheets

(51) Int. Cl.
*H04W 48/16* (2009.01)
*H04W 36/14* (2009.01)

(56) References Cited

U.S. PATENT DOCUMENTS

2012/0155383 A1* 6/2012 Singh et al. .................. 370/328
2013/0183982 A1 7/2013 Martin et al.
2013/0189972 A1 7/2013 Martin et al.

OTHER PUBLICATIONS

3rd Generation Partnership Project; Technical Specification Group Radio Access Network; User Equipment (UE) procedures in idle mode and procedures for cell reselection in connected mode (Release 10), 3GPP Standard; 3GPP TS 25.304, 3rd Generation Partnership Project (3GPP), Mobile Competence Centre; 650, Route Des Lucioles; F-06921 Sophia-Antipolis Cedex; France, No. V10.0.0, Mar. 28, 2011, pp. 1-51, XP050476462, [retrieved on Mar. 28, 2011].
Ericsson: "UE behaviour in Out-of-service", 3GPP Draft; R2-031152, 3rd Generation Partnership Project (3GPP), Mobile Competence Centre, 650, Route Des Lucioles, F-06921 Sophia-Antipolis Cedex, France, vol. RAN WG2, No. Paris, France, May 13, 2003, 6 pages, XP050123546.
International Search Report and Written Opinion—PCT/US2014/043558—ISA/EPO—Nov. 5, 2014. (13 total pages).
Diaz Cubillan et al., "Automatic Neighbor Cell List Management," 4 pages.

* cited by examiner

METHOD AND APPARATUS FOR REGAINING SERVICE BY SELECTING A DETECTED CELL NOT INCLUDED IN A NEIGHBOR CELL LIST (NCL)

CLAIM OF PRIORITY UNDER 35 U.S.C. §119

The present application for patent claims priority to U.S. Provisional Patent Application No. 61/840,051, filed Jun. 27, 2013, entitled "Method and Apparatus for Regaining Service by Selecting a Detected Cell Not Included in a Neighbor Cell List (NCL)," which is assigned to the assignee hereof, and hereby expressly incorporated by reference herein.

BACKGROUND

Aspects of the present disclosure relate generally to wireless communications and, more particularly, to a method and an apparatus for regaining service by selecting a detected cell not included in a neighbor cell list (NCL).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

$3^{rd}$ Generation Partnership Project (3GPP) standards have specified rules and methods for handling idle mode cell camping, selection, and/or reselection in TS 25.133 and TS 25.304 (both of which are hereby incorporated by reference in their entirety). As per the specifications, a user equipment (UE) should move to a highest "ranked" cell that is part of a signaled neighbor cell lists (NCL) when the UE is having difficulty communicating with its current serving cell. More particularly, when the UE is in a relatively poor radio frequency (RF) scenario, e.g., its current serving cell is weak and it cannot find a neighbor cell that is stronger, the specification prescribes that the UE should report its out-of-service status to higher layers once the UE has failed cell selection criteria (S-criteria) for 12 seconds. The S-criteria is fulfilled when Srxlev>0 and Squal>0, where Srxlev is a cell selection receive level value in decibels (dB) and Squal is a cell selection quality value in decibels (dB).

Upon declaring out-of-service status, the standards prescribe that the UE camp on a new cell as soon as possible. To accomplish this, the UE scans all supported frequency bands to find the best cell it can camp on. However, this frequency scan is costly in terms of duration and power consumed and may cause an undesirable delay in re-establishing connection.

As such, improvements in acquiring service upon determining that a UE has an out-of-service status are desired.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for regaining service at a user equipment. For example, the present disclosure presents an example method for receiving, from a serving cell, a neighbor cell list and scanning, by the user equipment, to identify target cells, wherein the target cells include neighbor cells included in the neighbor cell list and detected cells not included in the neighbor cell list. In addition, such method may include determining that the user equipment cannot successfully camp on any one of the neighbor cells and attempting to camp on one of the detected cells.

In an additional aspect, an apparatus for regaining service at a user equipment is disclosed. The apparatus may include means for receiving, from a serving cell, a neighbor cell list and means for scanning, by the user equipment, to identify target cells, wherein the target cells include neighbor cells included in the neighbor cell list and detected cells not included in the neighbor cell list. In addition such apparatus may include means for determining that the user equipment cannot successfully camp on any one of the neighbor cells and means for attempting to camp on one of the detected cells.

Moreover, the present disclosure presents a computer program product for regaining service at a user equipment. The computer program product may include a computer-readable medium comprising code executable by a computer for receiving, from a serving cell, a neighbor cell list and scanning, by the user equipment, to identify target cells, wherein the target cells include neighbor cells included in the neighbor cell list and detected cells not included in the neighbor cell list. In additional such computer program product may include determining that the user equipment cannot successfully camp on any one of the neighbor cells and attempting to camp on one of the detected cells.

Furthermore, an apparatus for regaining service at a user equipment is described. The apparatus may include at least one memory, a neighbor cell component configured to receive, from a serving cell, a neighbor cell list, and a scanning component configured to scan, by the user equipment, to identify target cells, wherein the target cells include neighbor cells included in the neighbor cell list and detected cells not included in the neighbor cell list. In addition, such apparatus may include a camping module configured to determine that the user equipment cannot successfully camp on any one of the neighbor cells, and attempt to camp on one of the detected cells.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
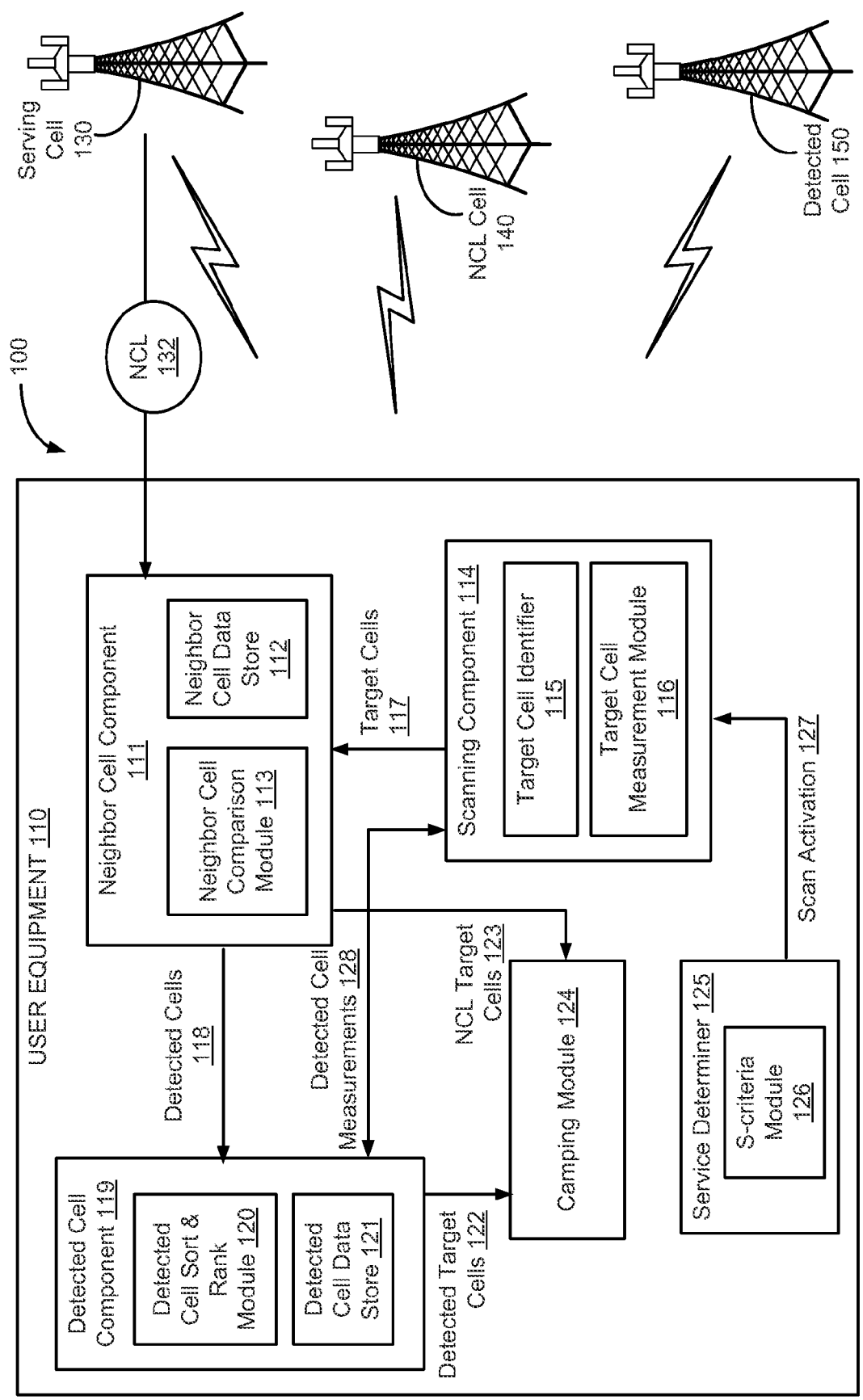
FIG. 1 is a block diagram of a wireless communication system according to the present aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

A new behavior for regaining service at a user equipment (UE) is described. Currently, the relevant 3rd Generation Partnership Project (3GPP) standards TS 25.133 and TS 25.304 (both of which are hereby incorporated by reference in their entirety) prescribe that a UE should move to a highest "ranked" cell that is part of a signaled neighbor cell list (NCL) when the UE is having difficulty communicating with its current, serving cell and/or when the UE has failed the S-criteria (e.g., Srxlv or Squal≤0 for a specified period of time, such as 12 seconds). However, the current procedure for doing so includes extensive frequency scanning to find, and camp on, an acceptable cell within the NCL. As such, the UE may experience an undesirable delay in returning to service and/or may have to remain in an out-of-service state.

Instead, and according to the present aspects, a UE may attempt to regain service by selecting a detected cell that is not included in a neighbor cell list (NCL). Although it is often preferable for a UE to acquire service within a particular public land mobile network (PLMN) (e.g., a home public land mobile network (HPLMN) with which the UE is associated), the UE may seek to acquire service with another PLMN (e.g., a visited public land mobile network (VPLMN)) rather than going out-of-service.

According to the 3GPP standards, a UE may measure Srxlev—a cell selection receive level value in decibels (dB)—and Squal—a cell selection quality value also in decibels (dB)—for all cells within the NCL. The NCL may be broadcast by the network (e.g., in System Information Blocks (SIB) 11/12) in order to inform the UE about neighbor cells that may be good candidates for handover when the UE finds itself in a poor radio frequency (RF) scenario with respect to its current serving cell. In WCDMA, for example, in order to find another acceptable cell (as a result of the poor RF scenario), a UE may scan up to two additional inter-frequencies in addition to the frequency of its current serving cell. However, it will be appreciated that the present aspects may be applied to other radio access technologies (RAT) and standards and that a UE may search one, two, or more than two frequencies other than the frequency of its current serving cell.

While searching (both inter-frequency and intra-frequency) to discover cells within the NCL, and performing the Srxlev and Squal measurements of the NCL cells, the UE may detect other cells that are not included in the NCL. Such cells may be associated with another PLMN or otherwise not included within the NCL. By detecting such non-NCL cells, the UE may determine a received signal strength (e.g., a strength of the signal when received at the UE), or received signal code power (RSCP), for the non-NCL cells. As such, the UE may later, if needed, gauge the relative received signal strength of the non-NCL cells in comparison to the NCL cells and one another in order to find a suitable cell on which to attempt to camp.

Specifically, according to the present aspects, rather than immediately reporting an out-of-service status to higher layers once a UE fails the S-criteria—and triggering an extensive frequency scan procedure—a UE may attempt to regain service on a non-NCL cell. More particularly, while the UE has service, it may perform inter-frequency and intra-frequency scans to discover target cells within the NCL (e.g., cells to which the UE may request handover if the signal strength of its current serving cell deteriorates). During such a scan, the UE may detect non-NCL cells and determine RSCP for each of the detected cells. The UE may store information related to the non-NCL cells to be retrieved later when the UE is in danger of going out-of-service and triggering an extensive frequency scanning procedure. The UE may determine which cells are non-NCL detected cells by considering all cells identified during a scan and removing cells included in the NCL.

At a later point in time, the UE then may determine that its current serving cell has deteriorated to the point where the UE needs to gain service elsewhere. In other words, the UE may fail the S-criteria (e.g., Srxlv or Squal≤0) for a specified period of time. The period of time may be, in a non-limiting example, 12 seconds, and may be preconfigured and/or dynamically altered. In response, the UE may perform the standards-prescribed reselection algorithm, as per TS 25.304 and/or TS 25.133 (both of which are hereby incorporated by reference in their entirety) for determining whether cells within the NCL list are suitable for reselection. If none of the NCL cells are reselection candidates, and before reporting an out-of-service state to the higher layers, the UE may search for an acceptable non-NCL cell.

More particularly, the UE may compute Srxlv and Squal, or a modified cell ranking, for all cells in the detected set of cells not included in the NCL. When performing these measurements for NCL cells, additional information about the cells are included within the NCL broadcast, such as, a particular algorithm to be used to calculate Srxlv and Squal and parameters associated with the algorithm and the NCL cells. However, for the detected cells, which are not included in the NCL, such information may not be available to the UE (e.g., will not have been provided by the network). As such, the UE may perform such measurements using, parameters associated with the current serving cell or otherwise. The UE then may sort and rank the detected, non-NCL cells based on their detected signal strength, or RSCP, for all cells that have a ratio of pilot power to total power (Ec/Io) greater than a threshold (e.g., Ec/Io>Threshold). The threshold may be preconfigured, dynamically altered, or provided for in some other way.

Once the non-NCL cells are sorted and ranked, the UE may select the cell with the highest ranking, which may be, for example, the highest Common Pilot Channel (CPICH) RSCP, on which to attempt to camp. If the UE cannot camp onto the selected cell, the UE may select the next highest cell in the sorted and ranked list of non-NCL cells and attempt to camp thereon. The UE may continue this procedure any number of times, or for a particular amount of time, until it can successfully camp onto one of the detected non-NCL cells. If the UE cannot successfully camp on one of the detected non-NCL cells upon expiration of a number of times that the UE may perform the procedure and/or a particular amount of time passes, the UE may declare out-of-service status to the higher layers and proceed with the standard-prescribed out-of-service procedures.

Referring to FIG. 1, a wireless communication system 100 is illustrated that includes a user equipment (UE) 110 configured to regain service by selecting a detected cell not included in a neighbor cell list (NCL) to camp on. UE 110 may be in communication with a serving cell 130, a cell included in the NCL, such as NCL cell 140, and a cell not included in the NCL, such as non-NCL cell or detected cell 150.

In an aspect, serving cell 130, NCL cell 140 and/or detected cell 150, which also may be referred to as access points or nodes, may be a macrocell, picocell, femtocell, relay, Node B, mobile Node B, UE (e.g., communicating in peer-to-peer or ad-hoc mode with UE 110), or substantially any type of component that can communicate with UE 110 to provide wireless network access.

In an aspect, mobile apparatus, for example, UE 110, also may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an aspect, serving cell 130 may be configured to provide a neighbor cell list (NCL) 132 to UE 110. In an aspect, for example, NCL 132 may be broadcast by serving cell 130 and/or some other network entity on System Information Blocks (SIB) 11/12. NCL 132 may include information about neighboring cells, for example, NCL cell 140, which are associated with the same public land mobile network (PLMN) as serving cell 130. The neighboring cell information may include frequencies, identifiers, a PLMN identifier, measurements, and/or the like. Non-NCL cell 150 may be associated with a PLMN that is different from the PLMN associated with serving cell 130 and NCL cell 140. For example, in an aspect, detected 150 may be associated with a visited public land mobile network (VPLMN).

In an aspect, UE 110 includes neighbor cell component 111 configured to receive NCL 132 from serving cell 130 and store contents of the NCL in neighbor cell data store 112. Neighbor cell data store 112 may be a data store, memory, or other component capable of storing NCL information. In an aspect, serving cell 130 may provide updates to NCL 132 and, as such, neighbor cell component 111 may be configured to update the contents of neighbor cell data store 112 accordingly. Neighbor cell component 111 also includes neighbor cell comparison module 113 configured to compare target cells identified by scanning component 114 to NCL 132, as stored in neighbor cell data store 112, to determine which of the target cells are neighbor cells in the NCL and which cells are detected cells.

In an aspect, UE 110 includes scanning component 114 configured to scan for target cells while UE 110 has service, e.g., before UE 110 has gone out-of-service. Scanning component 114 includes target cell identifier 115 configured to identify target cells by performing inter-frequency and/or intra-frequency scans. In other words, target cell identifier 115 may be configured to scan a frequency associated with serving cell 130 (and its PLMN) and one or more other frequencies (e.g., frequencies associated with PLMNs other than the PLMN associated with serving cell 130). As such, target cell identifier 115 may identify both cells that are included within NCL 132 and detected cells that are not included within NCL 132. Scanning component 114 also includes target cell measurement module 116 configured to measure and/or calculate Srxlv and Squal for each target cell identified by target cell identifier 115. In an aspect, target cell measurement module 116 may be configured to measure and/or calculate one or more of a received signal strength, a received signal code power (RSCP) values (e.g., on the common pilot channel (CPICH)), and a ratio of pilot power to total power (Ec/Io) for each target cell identified by target cell identifier 115. In an additional aspect, scanning component 114 may be configured to communicate the identified target cells 117 to neighbor cell component 111.

In an aspect, UE 110 includes service determiner 125 configured to determine whether UE 110 currently has service, is in danger of going out-of-service, or has gone out-of-service. Service determiner 125 includes cell selection criteria (S-criteria) module 126 configured to determine whether UE 110 has passed or failed S-criteria (e.g., Srxlv and Squal) for more than a threshold amount of time (e.g., 12 seconds). In an aspect, S-criteria module 126 may be configured to calculate Srxlv and Squal for the current serving cell 130 and determine that one of Srxlv and Squal is less than or equal to zero (e.g., Srxlv or Squal≤0) for more than a period of time (e.g., 12 seconds). In response to determining that UE 110 has failed the S-criteria, service determiner 125 may be configured to communicate scan activation 127 to scanning component 114.

In an aspect, in response to receiving scan activation 127, target cell identifier 115 may be further configured to scan to identify target cells on to which UE 110 may attempt to regain service in response to the determination that UE 110 is out-of-service (e.g., has failed the S-criteria). As described above, target cell identifier 115 may be configured to perform intra-frequency and/or inter-frequency scans to identify target cells and target cell measurement module 116 may be configured to measure and/or calculate various values for each of the cells identified by target cell identifier 115. As also described above, scanning component 114 may be configured to communicate all of the identified target cells 117 (e.g., both NCL and detected cells) to neighbor cell component 111.

In an aspect, in response to receiving target cells 117, neighbor cell comparison module 113 may be further configured to compare each of the identified target cells 117 to the cells in NCL 132 stored within neighbor cell data store 112. In response to identifying those cells that are included in the NCL 132, neighbor cell component 111 may be configured to communicate NCL target cells 123 to camping module 124. In response to identifying those cells that are not included in the NCL 132, neighbor cell component 111 may be configured to communicate detected cells 118 to detected cell component 119.

In an aspect, UE 110 includes detected cell component 119 configured to sort and store information associated with detected cells that were identified by scanning component 114, but are not included in NCL 132. Detected cell component 119 includes detected cell sort and rank module 120 configured to calculate Srxlv and Squal for the detected cells 118, determine signal strength information for the detected cells (e.g., RSCP, Ec/Io) and store the calculated Srxlv and Squal and signal strength information in association with an identifier for each of the detected cells 118 in detected cell data store 121. In an aspect, detected cell component 119 may be configured to retrieve measurements for the detected cells 118 from scanning component 114 and/or target cell measurement module 116, as detected cell measurements 128. Detected cell sort and rank module 120 may be configured to sort the detected cells 118 prior to, or after, storing in detected cell data store 121. In an aspect, sorting the detected cells 118 may include determining a RSCP value for each of the detected cells 118, identifying that a ratio of pilot power to total power (Ec/Io) of one or more detected cells 118 is above a threshold, sorting the detected cells 118 having an Ec/Io above the threshold, and, based on the RSCP values (e.g., on the common pilot channel (CPICH)), ranking the sorted detected cells 118 according to a likelihood that UE 110 may successfully camp thereon. In an aspect, cells having an Ec/Io below the threshold may not be stored within detected cell data store 121.

In an aspect, UE 110 includes camping module 124 configured to attempt to, and camp on, cells. In an aspect, in response to receiving NCL target cells 123 from neighbor cell component 111, camping module 124 may be configured to attempt to camp on one of NCL target cells 123. In an aspect, camping module 124 may be configured to attempt to camp on one of NCL target cells 123 according to the algorithms and parameters defined by the standards and received from the network, in connection with, for example, NCL 132, respectively, for each of NCL target cells 123. Based on the algorithms and the parameters, camping module 124 may determine whether one of NCL target cells 123 is suitable, e.g., strong enough, to camp on.

In an aspect, if camping module 124 fails to camp on one of NCL target cells 123, camping module 124 may request information related to the detected cells that are not included in NCL 132 (e.g., non-NCL target cells 122), and attempt to camp on one of the detected target cells 122. In an aspect, camping module 124 may be configured to attempt to camp first on the detected target cells 122 having the highest ranking (as sorted and ranked within detected cell data store 121 by detected cell sort and rank module 120). In an aspect, detected target cells 122 may include information related to rankings of detected cells 118 such that detected target cells 122 may include multiple detected target cells and their corresponding ranks.

In an aspect, detected cell component 119 may be configured to communicate a first ranked detected target cell 122 to camping module 124. Upon determining that UE 110 cannot camp on the first ranked detected target cell 122, camping module 124 may be configured to request a next highest ranked detected target cell 122 be sent by detected cell component 119 to camping module 124. Camping module 124 then may attempt to camp on the next-highest ranked detected target cell 122, and so on, until UE 110 either successfully camps on or until all of the ranked detected target cells 122 have been exhausted. In an aspect, camping module 124 may be configured to request all detected target cells 122 and corresponding ranks from detected cell component 119 and receive both together.

In an aspect, camping module 124 may be configured to successfully camp on one of the detected target cells 122. In an additional or optional aspect, after camping on the detected target cell, it may still be desirable for UE 110 to continue its attempts to camp on to a cell included in the NCL 132 (e.g., a cell associated with the same PLMN as is associated with serving cell 130). As such, and in an aspect, camping module 124 and/or other components of UE 110 may be configured to attempt to regain service on a cell included in NCL 132 after expiration of a particular amount of time, a number of cycles, and/or at a predetermined time. In an additional aspect, camping module 124 and/or other components of UE 110 may be configured to attempt to regain service on a cell included in NCL 132 after detecting a change in radio frequency (RF) scenario, that UE 110 has relocated, and/or based on some other factor.

Figure 2:
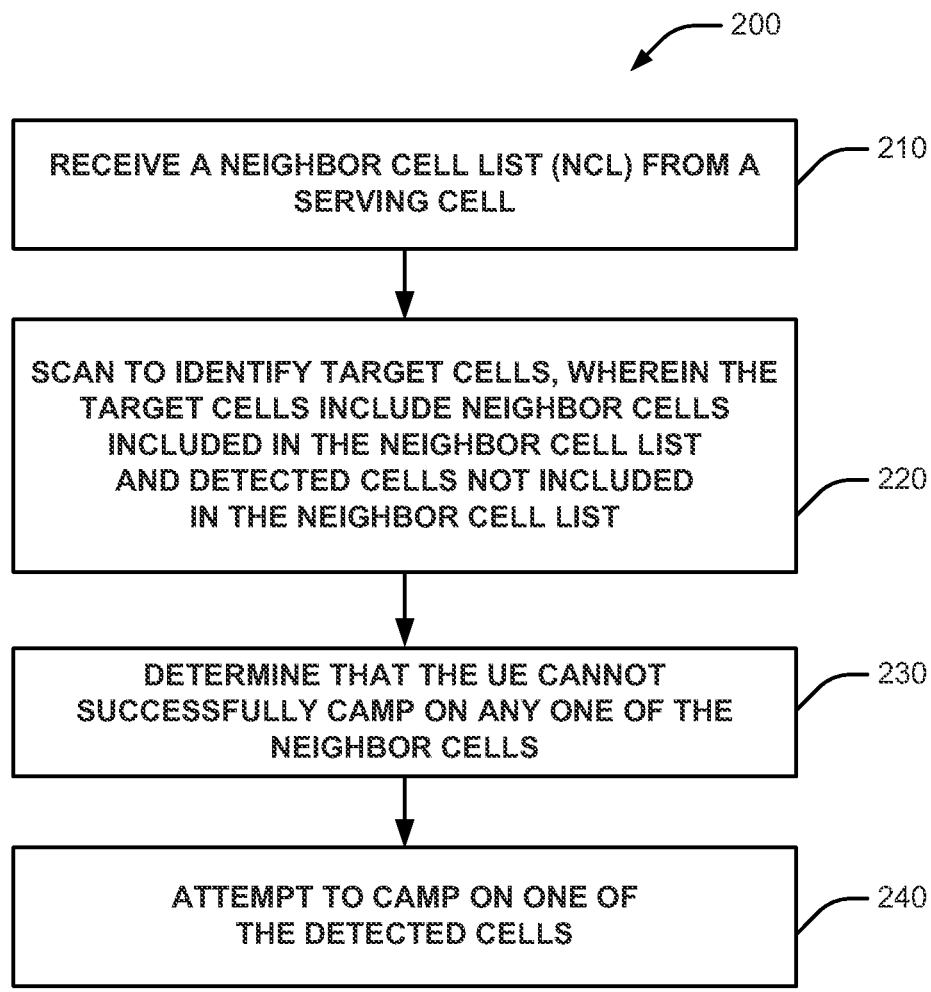
FIG. 2 is a flow chart of a method for regaining service by selecting a detected cell not included in an NCL by a UE, according to the present aspects.

Referring to FIG. 2, a method 200 for regaining service at a user equipment (UE) by selecting a detected cell not included in a neighbor cell list (NCL) may be performed by UE 110 of FIG. 1. More particularly, aspects of method 200 may be performed by serving cell 130, neighbor cell component 111, scanning component 114, detected cell component 119, camping module 124, and service determiner 125, all of FIG. 1.

At 210, method 200 includes receiving, from a serving cell, a neighbor cell list. In an aspect, for example, neighbor cell component 111 receives, from serving cell 130, neighbor cell list (NCL) 132. In an aspect, the NCL 132 includes cells that are within a same PLMN as the serving cell 130, such as, for example, NCL cell 140.

At 220, method 200 includes scanning, by the user equipment, to identify target cells. In an aspect, for example, target cell identifier 115 may be configured to scan to identify target cells 117. Target cell identifier 115 may be configured to scan inter-frequency (e.g., at a frequency for the PLMN associated with serving cell 130) and/or intra-frequency (e.g., at frequencies for PLMNs other than the PLMN associated with serving cell 130) cells to identify target cells 117 while UE 110 has service and before its RF conditions deteriorates such that UE 110 may go out-of-service. In an aspect, target cell identifier 115 may be configured to scan for target cells that are both included in NCL 132 (e.g., NCL cell 140) and not included in NCL 132 (e.g., detected cell 150). Target cell measurement module 116 may be configured to measure and/or calculate Srxlv and Squal for each target cell identified by target cell identifier 115. In an aspect, target cell measurement module 116 may be configured to measure and/or calculate received signal code power (RSCP) (e.g., on the common pilot channel (CPICH)) and a ratio of pilot power to total power (Ec/Io) for each target cell identified by target cell identifier 115. In an aspect, scanning component 114 may be configured to communicate the identified target cells 117 to neighbor cell component 111. The identified target cells 117 may include NCL and/or detected cells.

Neighbor cell component 111 may be configured to compare each of the identified target cells 117 to the NCL 132, which may have been stored within neighbor cell data store 112 upon receipt from serving cell 130. In response to identifying those cells that are not included in the NCL 132, neighbor cell component 111 may be configured to communicate detected cells 118 to detected cell component 119. Detected cell sort and rank module 120 may be configured to calculate Srxlv and Squal for the detected cells 118, determine signal strength information for the detected cells (e.g., RSCP, Ec/Io) and store the calculated Srxlv and Squal and signal strength information in association with an identifier for each of the detected cells 118 in detected cell data store 121. In an aspect, detected cell component 119 may be configured to retrieve measurements for the detected cells 118 from scanning component 114 and/or target cell measurement module 116, as detected cell measurements 128. Detected cell component 119 may be configured to sort and rank the detected cells 118 prior to, or after, storing in detected cell data store 121. In an aspect, sorting the detected cells 118 may include determining an RSCP for each of the detected cells 118, identifying one or more detected cells 118 having a ratio of pilot power to total power (Ec/Io) above a threshold, sorting the detected cells 118 having an Ec/o above a threshold, and ranking the sorted detected cells 118. In an aspect, cells having an Ec/Io below the threshold may not be sorted, ranked, and/or stored within detected cell data store 121.

Optionally, and in an aspect (not shown), the method 200 may include determining that the user equipment fails a cell selection criteria (S-criteria). In an aspect, for example, service determiner 125 and/or S-criteria module 126 may be configured to determine that the UE 110 has failed the S-criteria for more than a threshold amount of time (e.g., 12 seconds). As such, the UE 110 is in danger of going out-of-service, or has gone out-of-service. In an aspect, S-criteria module 126 may be configured to calculate Srxlv and Squal for the current serving cell 130 and determine that one of Srxlv and Squal is less than or equal to zero (e.g., Srxlv or Squal≤0) for more than a period of time (e.g., 12 seconds). In an aspect, and additionally, UE 110 may measure Srxlv and Squal at other points in time (e.g., when the UE 110 is not necessarily in danger of going out-of-service) such that the UE 110 may gain advanced knowledge of the cells present in the vicinity (e.g., cells within the NCL and cells not included in the NCL). In response to determining that UE 110 has failed the S-criteria, service determiner 125 may be configured to communicate scan activation 127 to scanning component 114. In response, target cell identifier 115 may be configured to scan to identify target cells 117. Scanning component 114 may be configured to communicate all of the identified target cells 117 (e.g., both NCL and detected cells) to neighbor cell component 111. Neighbor cell component 111 may be configured to compare each of the identified target cells 117 to the NCL 132, which may have been stored within neighbor cell data store 112 upon receipt from serving cell 130. In response to identifying those cells that are included in the NCL 132, neighbor cell component 111 may be configured to communicate NCL target cells 123 to camping module 124. In response, camping module 124 may be configured to attempt to camp on one of the NCL target cells 123.

At 230, method 200 includes determining that the user equipment cannot successfully camp on one of the neighbor cells. In an aspect, camping module 124 may be configured to determine that UE 110 cannot successfully camp on any neighbor cell. In an aspect, camping module 124 may be configured to determine that UE 110 cannot successfully camp on any neighbor, NCL cell based on parameters related to the cells within the neighbor cell list from the serving cell, which were received from the network (e.g., from serving cell 130 in connection with the NCL 132), performing standards-prescribed algorithm(s) to determine if the cells within the NCL are suitable for reselection based on the parameters; and determining that none of the cells within the NCL are suitable to camp on.

At 240, method 200 includes attempting to camp on one of the detected cells. In an aspect, for example, camping module 124 may be configured to attempt to camp on one of the detected cells 118 (e.g., detected target cells 122). In an aspect, camping module 124 may receive non-NCL target cells 122 from detected cell component 119 and attempt to camp on one of the cells within non-NCL target cells 122. In an aspect, camping module 124 may be configured to attempt to camp first on the non-NCL target cell 122 having the highest ranking (as sorted and ranked within detected cell data store 121). In an aspect, non-NCL target cells 122 may include information related to rankings of detected cells 118 such that non-NCL target cells 122 may include multiple non-NCL target cells and their corresponding ranks or detected target cells 122 may include a single, first ranked (and then succeeding ranked) non-NCL target cell. In another aspect, camping module 124 may be configured to communicate with detected cell component 119 to request a first ranked detected target cell 122 and then, if attempts to camp on the first ranked detected target cell fail, requesting lower-ranked cells one at a time. In an aspect, camping module 124 may be configured to request all detected target cells 122 and corresponding ranks from detected cell component 119 and receive both together at the same time.

Optionally, and in an aspect (not shown), the method 200 may include successfully camping on one of the detected cells not included in the NCL. Optionally, and in an aspect (not shown), the method 200 also may include attempting to regain service on a cell included in the NCL after at least one of expiration of an amount of time, a number of cycles, at a predetermined time, a change in radio frequency scenario, and a change in geography.

Figure 3:
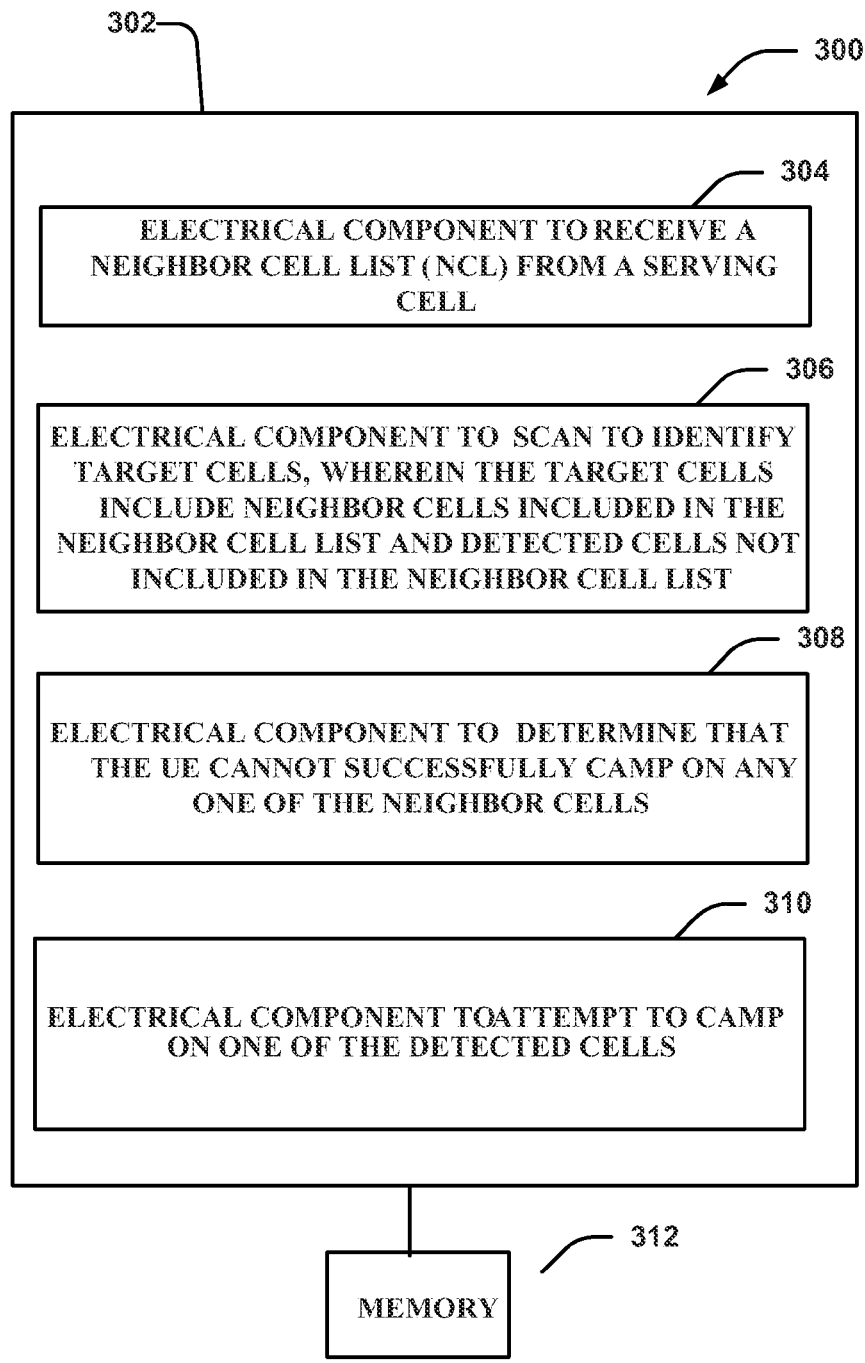
FIG. 3 is a block diagram illustrating aspects of a logical grouping of electrical components as contemplated by the present disclosure.

Referring to FIG. 3, an example system 300 is displayed for regaining service at a user equipment. For example, system 300 can reside at least partially within UE 110 (FIG. 1). It is to be appreciated that system 300 is represented as including functional blocks, which can be functional blocks that represent functions implemented by a processor, software, or combination thereof (for example, firmware). System 300 includes a logical grouping 302 of electrical components that can act in conjunction. For instance, logical grouping 302 can include an electrical component 304 to receive, from a serving cell, a neighbor cell list. In an aspect, electrical component 304 may comprise neighbor cell component 111 (FIG. 2).

Additionally, logical grouping 302 can include an electrical component 306 for scanning, by the user equipment, to identify target cells, wherein the target cells include neighbor cells included in the neighbor cell list and detected cells not included in the neighbor cell list. In an aspect, electrical component 306 may comprise scanning component 114 (FIG. 2).

Optionally, in an aspect, logical grouping 302 can include an electrical component (not shown) for determining that the user equipment fails cell selection criteria (S-criteria). In an aspect, the electrical component may comprise Service determine 124 and/or S-criteria module 126.

Furthermore, logical grouping 302 can include an electrical component 308 for determining that the user equipment cannot successfully camp on any one of the neighbor cells. In an aspect, for example, electrical component 308 may comprise camping module 124.

Additionally, logical grouping 302 can include an electrical component 310 for attempting to camp on one of the detected cells. In an aspect, for example, electrical component 310 may comprise camping module 124.

Further, system 300 can include a memory 312 that retains instructions for executing functions associated with the electrical components 304, 306, 308, and 310, stores data used or obtained by the electrical components 304, 306, 308, and 310 etc. While shown as being external to memory 312, it is to be understood that one or more of the electrical components 304, 306, 308, and 310 can exist within memory 312. In one example, electrical components 304, 306, 308, and 310 can comprise at least one processor, or each electrical component 304, 306, 308, and 310 can be a corresponding module of at least one processor. Moreover, in an additional or alternative example, electrical components 304, 306, 308, and 310 can be a computer program product including a computer readable medium, where each electrical component 304, 306, 308, and 310 can be corresponding code.

Figure 4:
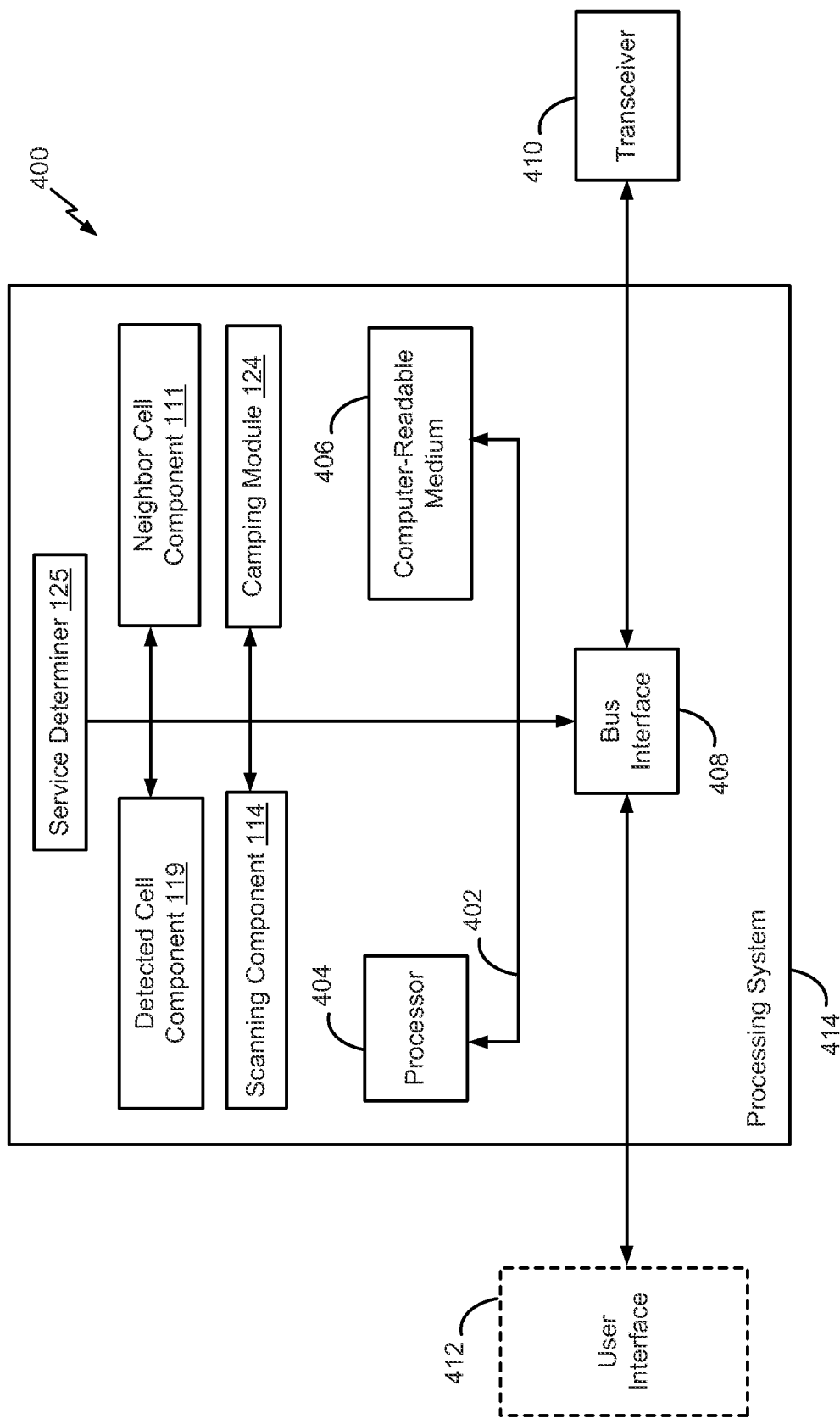
FIG. 4 is a block diagram illustrating an example of a hardware implementation for an apparatus employing a processing system.

FIG. 4 is a block diagram illustrating an example of a hardware implementation for an apparatus 400 employing a processing system 414. The apparatus may be, in an aspect, UE 110 of FIG. 1. In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, and computer-readable media, represented generally by the computer-readable medium 406. The bus 402 also links together service determiner 125, detected cell component 119, neighbor cell component 111, scanning component 114, and camping module 124, as described herein with respect to FIG. 1. The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. In an aspect, transceiver 410 may provide means for communicating with one of serving cell 140 (e.g., to receive NCL 142), NCL cell 140 and/or detected cell 150 of FIG. 1. Depending upon the nature of the apparatus, a user interface 412 (e.g., keypad, display, speaker, microphone, joystick) may also be provided.

Figure 5:
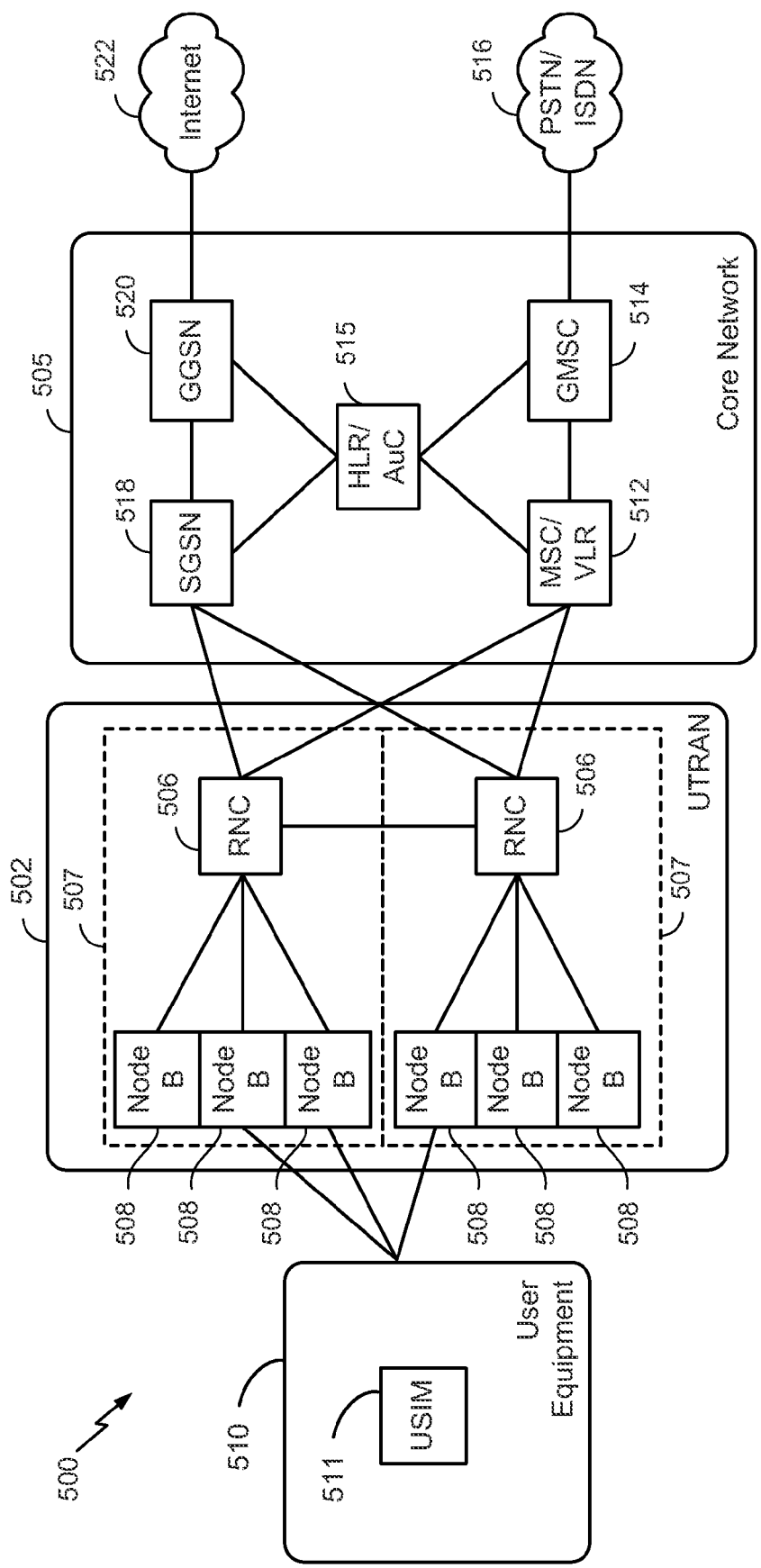
FIG. 5 is a block diagram conceptually illustrating an example of a telecommunications system.

The processor 404 is responsible for managing the bus 402 and general processing, including the execution of software stored on the computer-readable medium 406. The software, when executed by the processor 404, causes the processing system 414 to perform the various functions described herein with respect to FIGS. 1 and 2 for any particular apparatus. The computer-readable medium 406 may also be used for storing data that is manipulated by the processor 404 when executing software. The various concepts presented throughout this disclosure may be implemented across a broad variety of telecommunication systems, network architectures, and communication standards. By way of example and without limitation, the aspects of the present disclosure illustrated in FIG. 5 are presented with reference to a UMTS system 500 employing a W-CDMA air interface in which a user equipment (UE) 110 of FIG. 1, configured to regain service by selecting a detected cell not included in a neighbor cell list (NCL), may operate.

A UMTS network includes three interacting domains: a Core Network (CN) 505, a UMTS Terrestrial Radio Access Network (UTRAN) 502, and User Equipment (UE) 510. In this example, the UTRAN 502 provides various wireless services including telephony, video, data, messaging, broadcasts, and/or other services. The UTRAN 502 may include a plurality of Radio Network Subsystems (RNSs) such as an RNS 507, each controlled by a respective Radio Network Controller (RNC) such as an RNC 506. Here, the UTRAN 502 may include any number of RNCs 506 and RNSs 507 in addition to the RNCs 506 and RNSs 507 illustrated herein.

The RNC 506 is an apparatus responsible for, among other things, assigning, reconfiguring and releasing radio resources within the RNS 507. The RNC 506 may be interconnected to other RNCs (not shown) in the UTRAN 502 through various types of interfaces such as a direct physical connection, a virtual network, or the like, using any suitable transport network.

Communication between a UE 510 and a Node B 508 may be considered as including a physical (PHY) layer and a medium access control (MAC) layer. In an aspect, UE 510 may be UE 110 of FIG. 1 and Node B 508 may be serving cell 130, NCL cell 150, and/or detected cell 150, all of FIG. 1. Further, communication between a UE 510 and an RNC 506 by way of a respective Node B 508 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each RNS 507; however, the RNSs 507 may include any number of wireless Node Bs. The Node Bs 508 provide wireless access points to a CN 505 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 510 may further include a universal subscriber identity module (USIM) 511, which contains a user's subscription information to a network. For illustrative purposes, one UE 510 is shown in communication with a number of the Node Bs 508. The DL, also called the forward link, refers to the communication link from a Node B 508 to a UE 510, and the UL, also called the reverse link, refers to the communication link from a UE 510 to a Node B 508.

The CN 505 interfaces with one or more access networks, such as the UTRAN 502. As shown, the CN 505 is a GSM core network. However, as those skilled in the art will recognize, the various concepts presented throughout this disclosure may be implemented in a RAN, or other suitable access network, to provide UEs with access to types of CNs other than GSM networks.

The CN 505 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 505 supports circuit-switched services with a MSC 512 and a GMSC 514. In some applications, the GMSC 515 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a VLR that contains subscriber-related information for the duration that a UE is in the coverage area of the MSC 512. The GMSC 515 provides a gateway through the MSC 512 for the UE to access a circuit-switched network 516. The GMSC 515 includes a home location register (HLR) 514 containing subscriber data, such as the data reflecting the details of the services to which a particular user has subscribed. The HLR is also associated with an authentication center (AuC) that contains subscriber-specific authentication data. When a call is received for a particular UE, the GMSC 515 queries the HLR 514 to determine the UE's location and forwards the call to the particular MSC serving that location.

The CN 505 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 510 through the SGSN 518, which performs primarily the same functions in the packet-based domain as the MSC 512 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 508 and a UE 510. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 510 provides feedback to the Node B 508 over the HS-DPCCH to indicate whether it correctly decoded a packet on the downlink.

HS-DPCCH further includes feedback signaling from the UE 510 to assist the Node B 508 in taking the right decision in terms of modulation and coding scheme and precoding weight selection, this feedback signaling including the CQI and PCI.

"HSPA Evolved" or HSPA+ is an evolution of the HSPA standard that includes MIMO and 65-QAM, enabling increased throughput and higher performance. That is, in an aspect of the disclosure, the Node B 508 and/or the UE 510 may have multiple antennas supporting MIMO technology. The use of MIMO technology enables the Node B 508 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 510 to increase the data rate or to multiple UEs 510 to increase the overall system capacity. This is achieved by spatially precoding each data stream and then transmitting each spatially precoded stream through a different transmit antenna on the downlink. The spatially precoded data streams arrive at the UE(s) 510 with different spatial signatures, which enables each of the UE(s) 510 to recover the one or more the data streams destined for that UE 510. On the uplink, each UE 510 may transmit one or more spatially precoded data streams, which enables the Node B 508 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 6:
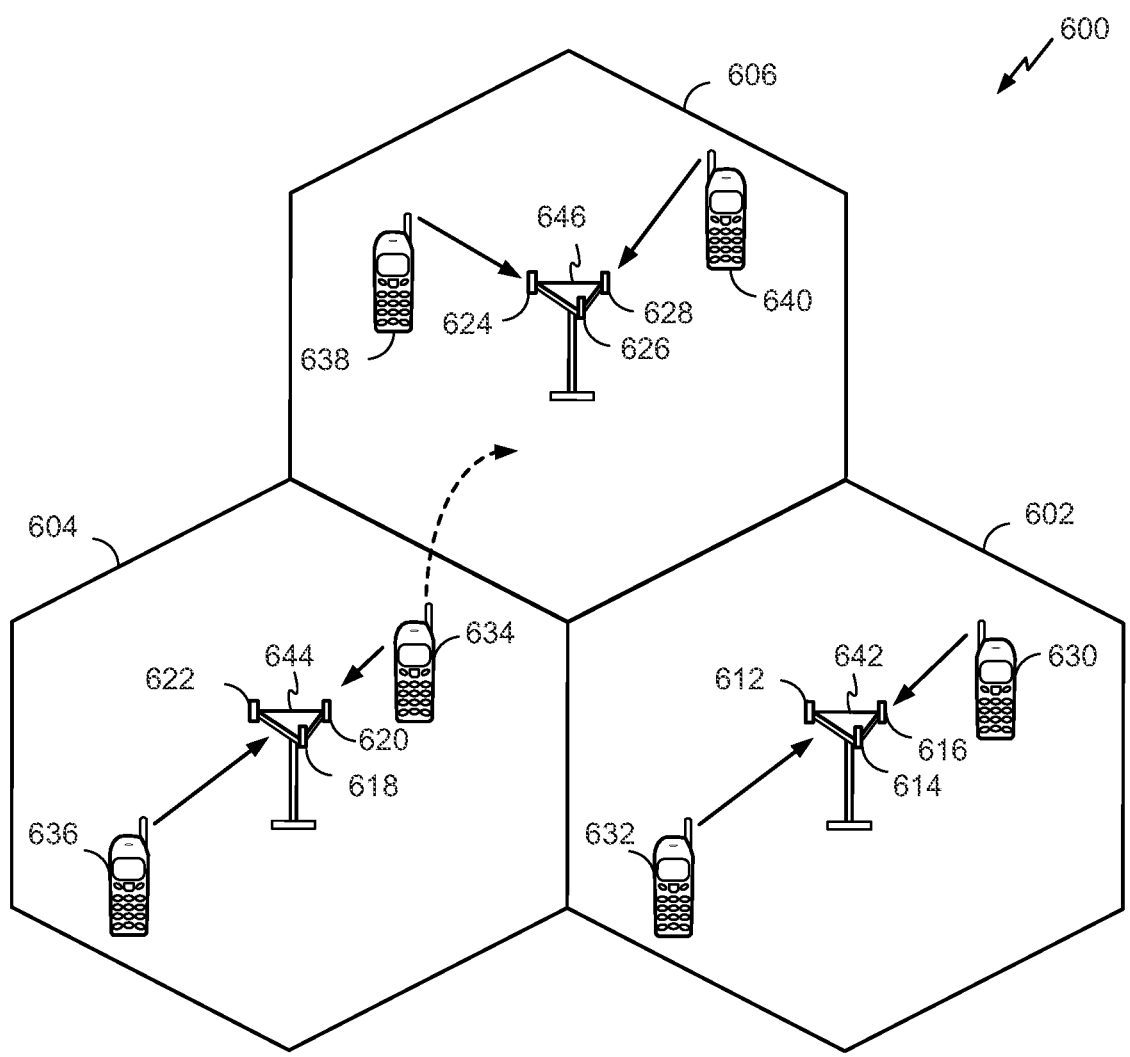
FIG. 6 is a conceptual diagram illustrating an example of an access network.

Referring to FIG. 6, an access network 600 in a UTRAN architecture, in which user equipment (UE) 110 of FIG. 1, is configured to regain service by selecting a detected cell not included in a neighbor cell list (NCL), may operate is illustrated. The multiple access wireless communication system includes multiple cellular regions (cells), including cells 602, 604, and 606, each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. The cells 602, 604 and 606 may include several wireless communication devices, e.g., User Equipment or UEs, which may be in communication with one or more sectors of each cell 602, 604 or 606. For example, UEs 630 and 632 may be in communication with Node B 642, UEs 634 and 636 may be in communication with Node B 644, and UEs 638 and 640 can be in communication with Node B 646. Here, each Node B 642, 644, 646 is configured to provide an access point to a CN 505 (see FIG. 5) for all the UEs 630, 632, 634, 636, 638, 640 in the respective cells 602, 604, and 606. In an aspect, UEs 630, 632, 634, 636, 638, and/or 640 may be UE 110 of FIG. 1, and Nodes B 642, 644, and 646 may be serving cell 130, NCL cell 140, and/or detected cell 160, all of FIG. 1.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 506 (see FIG. 5), or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set).

The modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the systems.

The radio protocol architecture may take on various forms depending on the particular application. An example for an HSPA system will now be presented with reference to FIG. 7.

Figure 7:
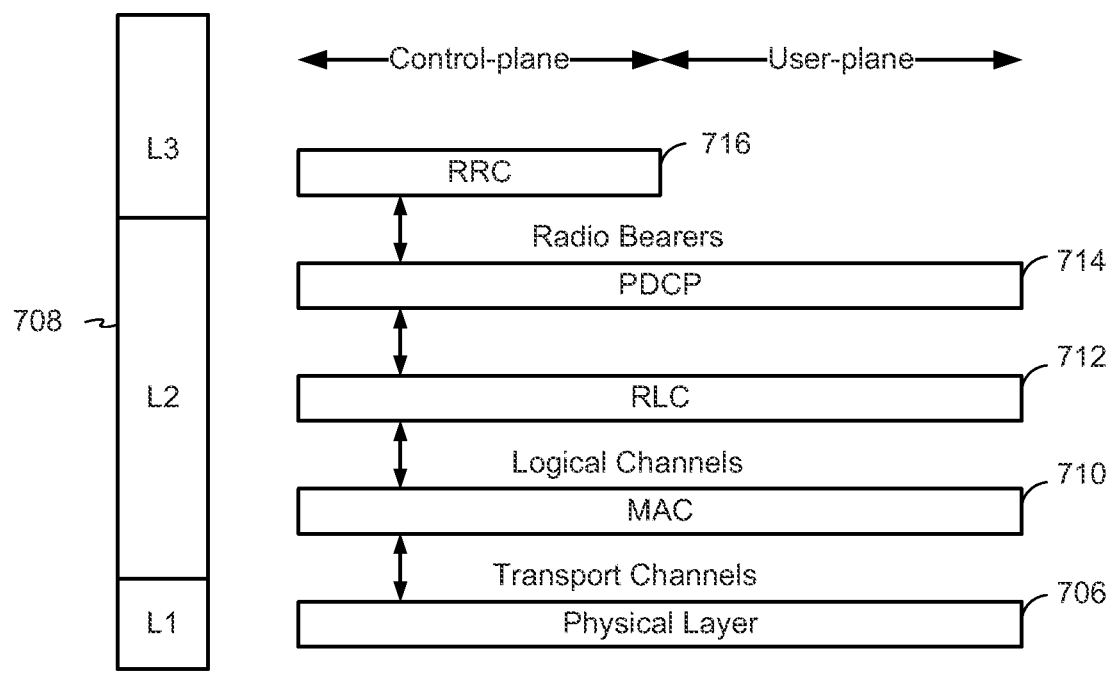
FIG. 7 is a conceptual diagram illustrating an example of a radio protocol architecture for the user and control plane.

Referring to FIG. 7, an example radio protocol architecture 700 relates to the user plane 702 and the control plane 704 of a user equipment (UE) or Node B/base station. For example, architecture 700 may be included in a UE such as UE 110 of FIG. 1, and/or a Node B/base station such as serving cell 130, NCL cell 140, and/or detected cell 150, also of FIG. 1. The radio protocol architecture 700 for the UE and Node B is shown with three layers: Layer 1 706, Layer 2 708, and Layer 3 710. Layer 1 706 is the lowest lower and implements various physical layer signal processing functions. As such, Layer 1 706 includes the physical layer 706. Layer 2 (L2 layer) 708 is above the physical layer 706 and is responsible for the link between the UE and Node B over the physical layer 706. Layer 3 (L3 layer) 710 includes a radio resource control (RRC) sublayer 716. The RRC sublayer 716 handles the control plane signaling of Layer 3 between the UE and the UTRAN.

In the user plane, the L2 layer 708 includes a media access control (MAC) sublayer 710, a radio link control (RLC) sublayer 712, and a packet data convergence protocol (PDCP) 714 sublayer, which are terminated at the Node B on the network side. Although not shown, the UE may have several upper layers above the L2 layer 708 including a network layer (e.g., IP layer) that is terminated at a PDN gateway on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between Node Bs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

Figure 8:
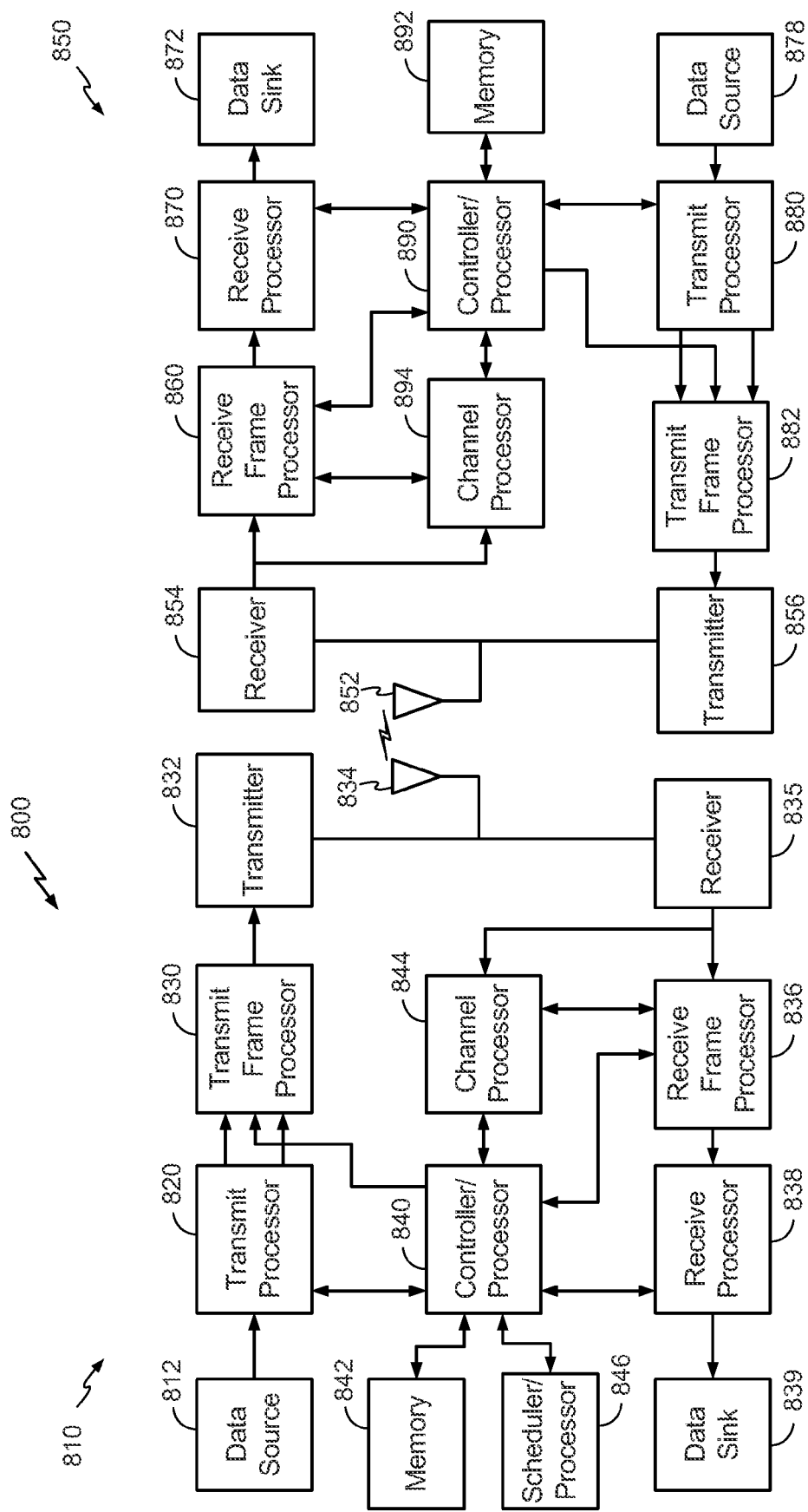
FIG. 8 is a block diagram conceptually illustrating an example of a Node B in communication with a UE in a telecommunications system.

FIG. 8 is a block diagram of a Node B 810 in communication with a UE 850, which may be configured to regain service by selecting a detected cell not included in a neighbor cell list (NCL). In an aspect, Node B 810 may be Node B 508 of FIG. 5, serving cell 130, NCL cell 140, and/or detected cell 150, all of FIG. 1, and UE 850 may be UE 510 of FIG. 5 and/or UE 110 of FIG. 1. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/ or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 880. The receive processor 880 then performs the inverse of the processing performed by the transmit processor 820 in the Node B 810. More specifically, the receive processor 880 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 882, which represents applications running in the UE 850 and/or various user interfaces (e.g., display). Control signals carried by successfully decoded frames will be provided to a controller/processor 890. When frames are unsuccessfully decoded by the receiver processor 880, the controller/processor 890 may also use an acknowledgement (ACK) and/or negative acknowledgement (NACK) protocol to support retransmission requests for those frames.

In the uplink, data from a data source 888 and control signals from the controller/processor 890 are provided to a transmit processor 880. The data source 888 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal.

In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for regaining service at a user equipment, comprising:
   receiving, from a serving cell, a neighbor cell list;
   scanning, by the user equipment, to identify target cells, wherein the target cells include neighbor cells included in the neighbor cell list and detected cells identified during the scanning which are not included in the neighbor cell list;
   calculating a cell selection receive level value ($S_{rxlv}$), a cell selection quality value ($S_{qual}$), and signal strength information for each of the detected cells;
   storing the calculated $S_{rxlv}$ and $S_{qual}$ values and signal strength information at the user equipment in association with an identifier for each of the detected cells;
   sorting the detected cells;
   determining that the user equipment cannot successfully camp on any one of the neighbor cells; and
   attempting to camp on one of the detected cells.

2. The method of claim 1, wherein the sorting comprises:
   determining received signal code power (RSCP) values for each of the detected cells;
   identifying one or more detected cells having a ratio of pilot power to total power ($E_c/I_o$) above a threshold;
   sorting the detected cells having the $E_c/I_o$ above the threshold; and
   ranking the sorted detected cells based on the determined RSCP values.

3. The method of claim 2, wherein the attempting to camp comprises:
   attempting to camp on an identified cell having a highest rank;
   failing to camp on the identified cell having the highest rank; and
   attempting to camp on an identified cell having a next-highest ranking.

4. The method of claim 1, further comprising:
   successfully camping on one of the detected cells; and
   attempting to regain service on a neighbor cell upon an occurrence of at least one of an expiration of an amount of time, a number of cycles, a predetermined time, a change in radio frequency scenario, or a change in geography.

5. The method of claim 1,
   wherein the serving cell is associated with a first public land mobile network (PLMN),
   wherein the neighbor cell list includes cells that are within the first PLMN, and
   wherein the detected cells are not within the first PLMN.

6. The method of claim 1,
   wherein the serving cell is associated with a first public land mobile network (PLMN), and
   wherein the scanning comprises scanning on a frequency associated with the first PLMN and scanning on one or more frequencies associated with a second PLMN.

7. The method of claim 1, further comprising:
   determining that the user equipment fails a cell selection criteria (S-criteria) comprising:
      calculating $S_{rxlv}$ and $S_{qual}$ values for the current serving cell; and
      determining that at least one of the $S_{rxlv}$ for the current serving cell or the $S_{qual}$ value for the current serving cell is less than or equal to zero for more than a period of time.

8. The method of claim 1, wherein the determining that the user equipment cannot successfully camp on any neighbor cell comprises:
   receiving parameters related to the neighbor cells from the serving cell;
   evaluating suitability of the neighbor cells for reselection based on the parameters; and
   determining, based on the performing, that none of the neighbor cells are suitable to camp on.

9. An apparatus for regaining service at a user equipment, comprising:
   means for receiving, from a serving cell, a neighbor cell list;
   means for scanning, by the user equipment, to identify target cells, wherein the target cells include neighbor cells included in the neighbor cell list and detected cells identified during the scanning which are not included in the neighbor cell list;
   means for calculating a cell selection receive level value ($S_{rxlv}$), a cell selection quality value ($S_{qual}$), and signal strength information for each of the detected cells;
   means for storing the calculated $S_{rxlv}$ and $S_{qual}$ values and signal strength information at the user equipment in association with an identifier for each of the detected cells;
   means for sorting the detected cells;
   means for determining that the user equipment cannot successfully camp on any one of the neighbor cells; and
   means for attempting to camp on one of the detected cells.

10. The apparatus of claim 9, wherein the means for sorting is further configured to:
    determine received signal code power (RSCP) values for each of the detected cells;
    identify one or more detected cells having a ratio of pilot power to total power (Ec/Io) above a threshold;
    sort the detected cells having the Ec/Io above the threshold; and
    rank the sorted detected cells based on the determined RSCP values.

11. The apparatus of claim 10, wherein the means for attempting to camp further comprises:
    means for attempting to camp on an identified cell having a highest rank;
    means for failing to camp on the identified cell having the highest rank; and
    means for attempting to camp on an identified cell having a next-highest ranking.

12. The apparatus of claim 9, further comprising:
    means for successfully camping on one of the detected cells; and
    means for attempting to regain service on a neighbor cell upon an occurrence of at least one of an expiration of an amount of time, a number of cycles, a predetermined time, a change in radio frequency scenario, or a change in geography.

13. A non-transitory computer readable medium storing computer executable code for regaining service at a user equipment, comprising:
    code for receiving, from a serving cell, a neighbor cell list;
    code for scanning, by the user equipment, to identify target cells, wherein the target cells include neighbor cells included in the neighbor cell list and detected cells identified during the scanning which are not included in the neighbor cell list;
    code for calculating a cell selection receive level value ($S_{rxlv}$), a cell selection quality value ($S_{qual}$), and signal strength information for each of the detected cells;

code for storing the calculated $S_{rxlv}$ and $S_{qual}$ values and signal strength information at the user equipment in association with an identifier for each of the detected cells;

code for sorting the detected cells;

code for determining that the user equipment cannot successfully camp on any one of the neighbor cells; and code for attempting to camp on one of the detected cells.

14. The computer readable medium of claim 13, wherein the code for sorting comprises code for:

determining received signal code power (RSCP) values for each of the detected cells;

identifying one or more detected cells having a ratio of pilot power to total power (Ec/Io) above a threshold;

sorting the detected cells having the Ec/Io above the threshold; and ranking the sorted detected cells based on the determined RSCP values.

15. The computer readable medium of claim 14, wherein the code for attempting to camp comprises code for:

attempting to camp on an identified cell having a highest rank;

failing to camp on the identified cell having the highest rank; and attempting to camp on an identified cell having a next-highest ranking.

16. The computer readable medium claim 13, further comprising code for:

successfully camping on one of the detected cells; and attempting to regain service on a neighbor cell upon an occurrence of at least one of an expiration of an amount of time, a number of cycles, a predetermined time, a change in radio frequency scenario, or a change in geography.

17. The computer readable medium claim 13, wherein the serving cell is associated with a first public land mobile network (PLMN), wherein the neighbor cell list includes cells that are within the first PLMN, and wherein the detected cells are not within the first PLMN.

18. The computer readable medium claim 13, wherein the serving cell is associated with a first public land mobile network (PLMN), and wherein the scanning comprises scanning on a frequency associated with the first PLMN and scanning on one or more frequencies associated with a second PLMN.

19. An apparatus for regaining service at a user equipment, comprising:

a neighbor cell component configured to receive, from a serving cell, a neighbor cell list;

a scanning component configured to scan, by the user equipment, to identify target cells, wherein the target cells include neighbor cells included in the neighbor cell list and detected cells not included in the neighbor cell list;

a detected cell component configured to:

calculate Srxlv and Squal values and signal strength information for each of the detected cells;

store the calculated $S_{rxlv}$ and $S_{qual}$ values and signal strength information at the user equipment in association with an identifier for each of the detected cells;

sort the detected cells;

a camping module configured to determine that the user equipment cannot successfully camp on any one of the neighbor cells, and attempt to camp on one of the detected cells.

20. The apparatus of claim 19, wherein the detected cell component is further configured to:

determine received signal code power (RSCP) values for each of the detected cells;

identify one or more detected cells having a ratio of pilot power to total power ($E_c/I_o$) above a threshold;

sort the detected cells having the $E_c/I_o$ above the threshold; and rank the sorted detected cells based on the determined RSCP values.

21. The apparatus of claim 20, wherein the wherein the camping module is further configured to:

attempt to camp on an identified cell having a highest rank;

fail to camp on the identified cell having the highest rank; and attempt to camp on an identified cell having a next-highest ranking.

22. The apparatus of claim 19, wherein the camping module is further configured to:

successfully camping on one of the detected cells; and attempt to regain service on a neighbor cell upon an occurrence of at least one of an expiration of an amount of time, a number of cycles, a predetermined time, a change in radio frequency scenario, or a change in geography.

23. The apparatus of claim 19, wherein the serving cell is associated with a first public land mobile network (PLMN), wherein the neighbor cell list includes cells that are within the first PLMN, and wherein the detected cells are not within the first PLMN.

24. The apparatus of claim 19, wherein the serving cell is associated with a first public land mobile network (PLMN), and wherein the scanning comprises scanning on a frequency associated with the first PLMN and scanning on one or more frequencies associated with a second PLMN.

25. The apparatus of claim 19, wherein the service determiner component is further configured to:

calculate $S_{rxlv}$ and $S_{qual}$ values for the current serving cell; and determine that at least one of the $S_{rxlv}$ for the current serving cell or the $S_{qual}$ value for the current serving cell is less than or equal to zero for more than a period of time.

26. The apparatus of claim 19, wherein the camping module is further to:

receive parameters related to the neighbor cells from the serving cell;

evaluate suitability of the neighbor cells for reselection based on the parameters; and determine, based on the performing, that none of the neighbor cells are suitable to camp on.

* * * * *